United States Patent
Weng et al.

(10) Patent No.: US 10,051,575 B2
(45) Date of Patent: Aug. 14, 2018

(54) ADAPTIVELY DETERMINING A WAKEUP PERIOD

(71) Applicant: BlackBerry Limited, Waterloo (CA)

(72) Inventors: Jianfeng Weng, Kanata (CA); Andrew Mark Earnshaw, Kanata (CA); Xin Jin, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 100 days.

(21) Appl. No.: 14/321,534

(22) Filed: Jul. 1, 2014

(65) Prior Publication Data

US 2016/0007292 A1 Jan. 7, 2016

(51) Int. Cl.
*H04W 52/02* (2009.01)
*H04W 68/02* (2009.01)
*H04W 76/28* (2018.01)

(52) U.S. Cl.
CPC ........ *H04W 52/0235* (2013.01); *H04W 68/02* (2013.01); *H04W 76/28* (2018.02); *Y02D 70/00* (2018.01); *Y02D 70/122* (2018.01); *Y02D 70/1242* (2018.01); *Y02D 70/1262* (2018.01); *Y02D 70/1264* (2018.01); *Y02D 70/142* (2018.01); *Y02D 70/146* (2018.01); *Y02D 70/24* (2018.01); *Y02D 70/26* (2018.01)

(58) Field of Classification Search
None
See application file for complete search history.

(56) References Cited

U.S. PATENT DOCUMENTS

| | | | | |
|---|---|---|---|---|
| 2008/0268863 A1* | 10/2008 | Pedersen | ............... | H04L 1/0027 455/452.2 |
| 2012/0281553 A1* | 11/2012 | Mujtaba | ............ | H04M 1/72519 370/252 |
| 2013/0176873 A1* | 7/2013 | Ji | ........................ | H04W 76/048 370/252 |
| 2014/0179235 A1* | 6/2014 | Huang | ................. | H04B 7/0874 455/63.4 |
| 2015/0003311 A1* | 1/2015 | Feuersaenger | .... | H04W 52/0225 370/311 |

OTHER PUBLICATIONS

TS 36.133, "3rd Generation Partnership Project; Technical Specification Group Radio Access Network; Evolved Universal Terrestrial Radio Access (E-UTRA); Requirements for support of radio resource management (Release 8)", Version 8.8.0, Dec. 2009.

(Continued)

*Primary Examiner* — Christopher Crutchfield
*Assistant Examiner* — Alan Lindenbaum
(74) *Attorney, Agent, or Firm* — Fish & Richardson P.C.

(57) ABSTRACT

In some implementations, a method in a user equipment (UE) for adaptively determining a wakeup period includes determining a power level of a Downlink (DL) transmission from a base station during a first wakeup period within a Discontinuous Reception (DRX) inactive time. The UE deactivates a RF receiver in response to the determination of the second wakeup period. The UE activates the RF receiver at a beginning of the second wakeup period prior to a DRX active time. The UE receives a DL paging channel transmission during the DRX active time.

9 Claims, 4 Drawing Sheets

(56) References Cited

OTHER PUBLICATIONS

TS 36.213, "3rd Generation Partnership Project; Technical Specification Group Radio Access Network; Evolved Universal Terrestrial Radio Access (E-UTRA); Physical layer procedures (Release 8)", Version 8.8.0, Sep. 2009.
TS 36.321, "3rd Generation Partnership Project; Technical Specification Group Radio Access Network; Evolved Universal Terrestrial Radio Access (E-UTRA); Medium Access Control (MAC) protocol specification (Release 8)", Version 8.8.0, Dec. 2009.
TS 36.331, "3rd Generation Partnership Project; Technical Specification Group Radio Access Network; Evolved Universal Terrestrial Radio Access (E-UTRA); Radio Resource Control (RRC); Protocol specification (Release 8)", Version 8.8.0, Dec. 2009.
TS 36.304, "3rd Generation Partnership Project;Technical Specification Group Radio Access Network; Evolved Universal Terrestrial Radio Access E-UTRA: User Equipment (UE) procedures in idle mode", Version 8.8.0, Dec. 2009.

* cited by examiner

ADAPTIVELY DETERMINING A WAKEUP PERIOD

TECHNICAL FIELD

This disclosure relates to data transmission in communication systems and, more specifically, to adaptively determining a wakeup period.

BACKGROUND

A wireless communication system, such as a third generation partnership project (3GPP) long term evolution (LTE) system, may use Discontinuous Reception (DRX) procedures to reduce battery power consumption of a User Equipment (UE) in the system. For example, a base station in the wireless communication system may configure a DRX cycle for a UE. A configured DRX cycle may include a DRX inactive time and a DRX active time. A DRX active time may include one or more subframes. During the DRX active time, the base station may transmit DL transmission to the UE. A DRX inactive time may include the subframes from the end of the DRX active time in the last DRX cycle to the beginning of the DRX active time in the current DRX cycle. During the DRX inactive time, the base station may not send any Downlink (DL) communications to the UE. Therefore, the UE may deactivate some components during at least a portion of the DRX inactive time to save battery power, and activate these components during the DRX active time to receive the DL transmission.

The DRX cycle may be configured for a UE in either a connected mode or an idle mode. For example, a UE in an idle mode may wake up during the DRX active time to receive a DL paging channel transmission from a base station. The DL paging channel transmission may be an Earthquake Tsunami Warning System (ETWS) message, a broadcast system information message, or a paging message directed to the UE. A UE in a connected mode may wake up during the DRX active time to receive an ETWS message or a system information change notification transmitted on the DL paging channel. A UE in a connected mode may also wake up during the DRX active time to receive a Physical Downlink Shared Channel (PDSCH) transmission.

DETAILED DESCRIPTION

The present disclosure is directed to adaptively determining a wakeup period for a user equipment (UE). In a configured DRX cycle, the UE may wake up during the DRX active time to receive and decode a Downlink (DL) transmission from a base station. The DL transmission may include a DL paging channel transmission. In some implementations, the DL paging channel transmission may be transmitted at the beginning of the DRX active time. Therefore, the UE may prepare for the receiving and decoding operations prior to the beginning of the DRX active time. For example, the UE may activate a Phase Locked Loop (PLL). A PLL is an electronic circuit that generates an output signal whose phase is related to the phase of an input signal. The UE may activate the PLL to synchronize with the base station. In some implementations, the UE may also determine a wakeup period prior to the DRX active time. During the wakeup period, the UE may activate its Radio Frequency (RF) receiver to estimate the time and frequency of the DL transmission. The UE may also perform a channel estimation operation during the wakeup period.

In some implementations, the UE may perform the channel estimation operation based on the Reference Symbols (RSs) transmitted by the base station. For example, the UE may detect the raw channel estimates at the RS locations. The UE may interpolate the channel coefficients at the non-RS locations based on the raw channel estimates. In some implementations, the interpolation may be performed using a smoothing filtering or a Wiener filtering.

In some cases, the quality of the channel estimation may depend on the length of channel estimation time. Therefore the UE may determine a wakeup period that is long enough for the UE to obtain a channel estimation with sufficient quality.

Figure 1:
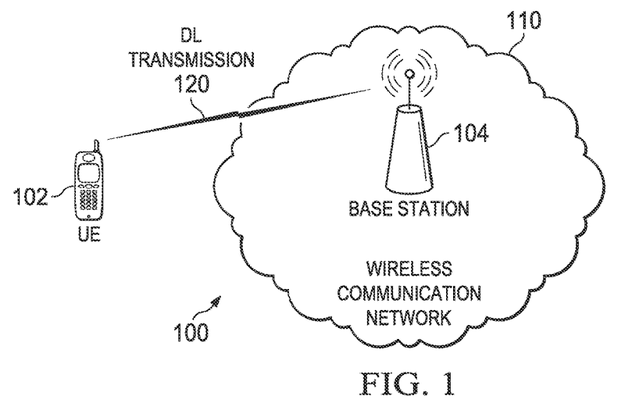
FIG. 1 is an example wireless communication system that adaptively determines a wakeup period.

FIG. 1 is an example wireless communication system 100 that adaptively determines a wakeup period. For example, in a wireless communication system, a UE may determine a received power level of a Downlink (DL) transmission from a base station during a first wakeup period within a DRX inactive time. In some implementations, the base station is an evolved NodeB (eNB) that supports third generation partnership project (3GPP) long term evolution (LTE) protocols. The UE may determine a second wakeup period based on the received power level of the DL transmission. The UE may deactivate a RF receiver in response to the determination of the second wakeup period. The UE may activate the RF receiver at the beginning of the second wakeup period prior to a DRX active time. The UE may receive a DL paging channel transmission during the DRX active time.

In some implementations, the UE may determine the second wakeup period based on a comparison of a Signal to Noise Ratio (SNR) to at least one predetermined threshold. The SNR may be determined based on the received power level of the DL transmission and a noise reference power level. In some implementations, the noise reference power level may be determined based on a background noise level and an interference power level in a previous DRX active time. In some implementations, the UE may determine a signal power offset and adjust the SNR based on the signal power offset. In some implementations, the UE may adjust the SNR based on a block error rate (BLER) of Physical Downlink Control Channel (PDCCH) messages.

In some implementations, the UE may determine a number of receiver antennas based on the received power level of the DL transmission. The UE may use the determined number of receiver antennas to receive the DL paging channel transmission. Determining the number of receiver antenna based on the received power level of the DL transmission may reduce the number of receiver antennas that the UE may use. This approach may reduce battery power consumption of the UE.

In some implementations, a UE may initiate a channel estimation operation during a wakeup period within a DRX inactive time. The UE may monitor a channel estimation quality indicator during the channel estimation operation. The UE may compare the channel estimation quality indicator with a predetermined threshold at a beginning of a DRX active. If the channel estimation equality indicator is equal to or higher than the predetermined threshold, the UE may initiate a decoding operation to decode a DL paging channel transmission. If the channel estimation quality indicator is lower than the predetermined threshold, the UE may store the DL paging channel transmission while the UE continues to perform the channel estimation operation. The UE may continue to monitor the channel estimation quality indicator until the channel estimation quality indicator is equal to or higher than the predetermined threshold. In such a case, the UE may initiate a decoding operation to decode the stored DL paging channel transmission. In some cases, the decoding operation is successful and the UE obtains the information included in the stored DL paging channel transmission. In some cases, the decoding operation is unsuccessful and the UE fails to obtain the information included in the stored DL paging channel transmission. In some implementations, the UE may deactivate a RF receiver after the UE completes the channel estimation operation and the decoding operation.

Adaptively determining a wakeup period according to methods and systems described herein may provide one or more advantages. For example, the channel estimation time may depend on the received power level of the DL transmission. If the received power level is significantly above the thermal noise floor (e.g., when the UE is in a high SNR or a high Signal to Interference and Noise Ratio (SINR) region), the channel estimation time may be short. In such a case, the UE may determine a shorter wakeup period. If the received power level is not significantly above the thermal noise floor, the channel estimation time may be long. Therefore the UE may determine a longer wakeup period. By adaptively determining the wakeup period based on the received power level of the DL transmission, the UE may reduce the wakeup period when the UE is in a high SNR or a high SINR region. Reducing wakeup period may reduce battery power consumption and therefore extend total standby time for the UE. Furthermore, storing the DL paging channel transmission may enable the UE to determine a short wakeup period when the UE is in a low SNR or a low SINR region. The UE may extend the channel estimation time by storing the DL paging channel transmission until the quality of the channel estimation meets a predetermined threshold.

Figure 2:
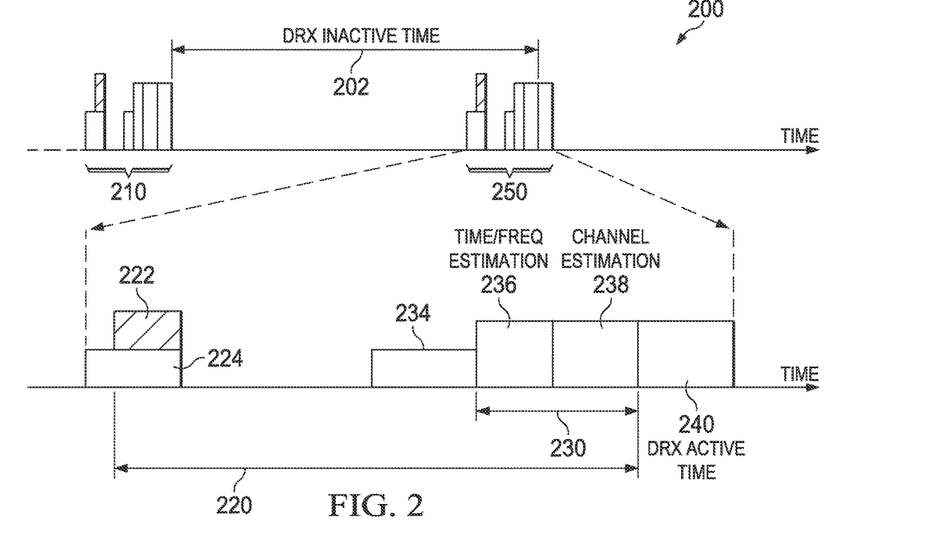
FIG. 2 is an example timing diagram for adaptively determining a wakeup period.
Figure 3:
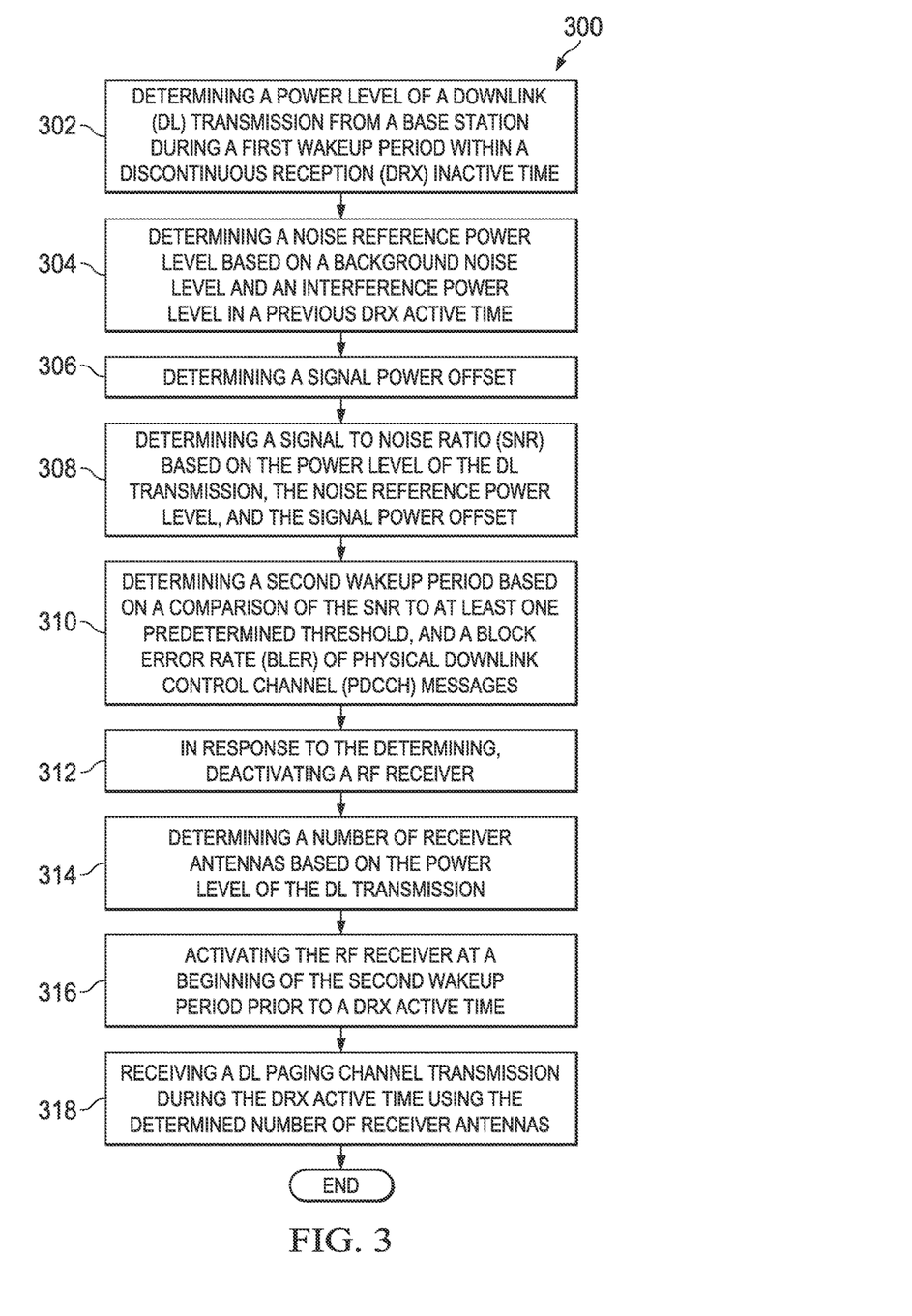
FIG. 3 is a flowchart illustrating a method for adaptively determining a wakeup period.

At a high level, the example wireless communication system 100 includes a UE 102 and a wireless communication network 110, which includes a base station 104 that is communicably coupled with the UE 102. In the illustrated example, the UE 102 may receive a DL transmission 120 from the base station 104. In the illustrated example, the wireless communication network 110 may configure a DRX cycle for the UE 102. The configured DRX cycle may include a DRX inactive time and a DRX active time. During the DRX inactive time, the UE 102 may deactivate its RF receiver to save battery power. In some instances, the UE 102 may determine a first wakeup period within the DRX inactive time. During the first wakeup period, the UE 102 may activate its RF receiver to receive the DL transmission 120. The UE 102 may determine a received power level of the DL transmission 120. The UE 102 may determine a second wakeup period based on the received power level of the DL transmission 120. The UE 102 may deactivate its RF receiver in response to the determination of the second wakeup period. The UE 102 may activate its RF receiver at the beginning of the second wakeup period prior to the DRX active time. The UE 102 may receive a DL paging channel transmission during the DRX active time. FIGS. 2-3 and associated descriptions provide additional details of these implementations.

Figure 4:
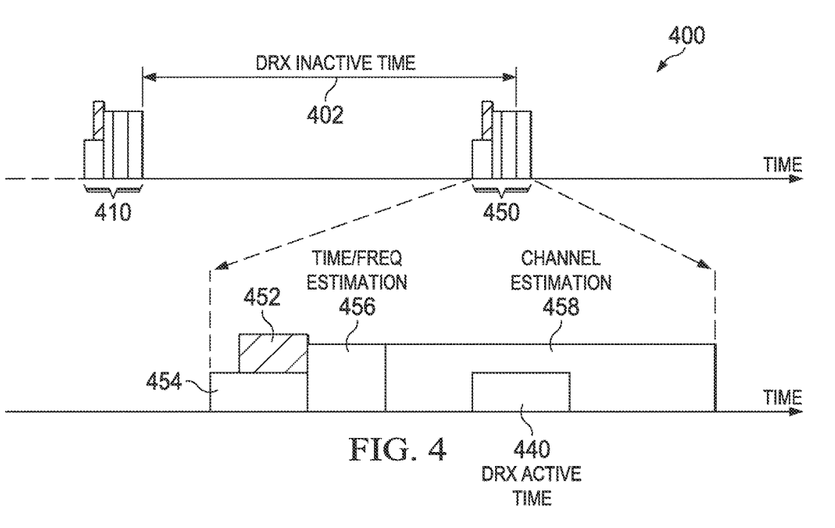
FIG. 4 is an example timing diagram for storing a DL paging channel transmission based on a channel estimation quality indicator.
Figure 5:
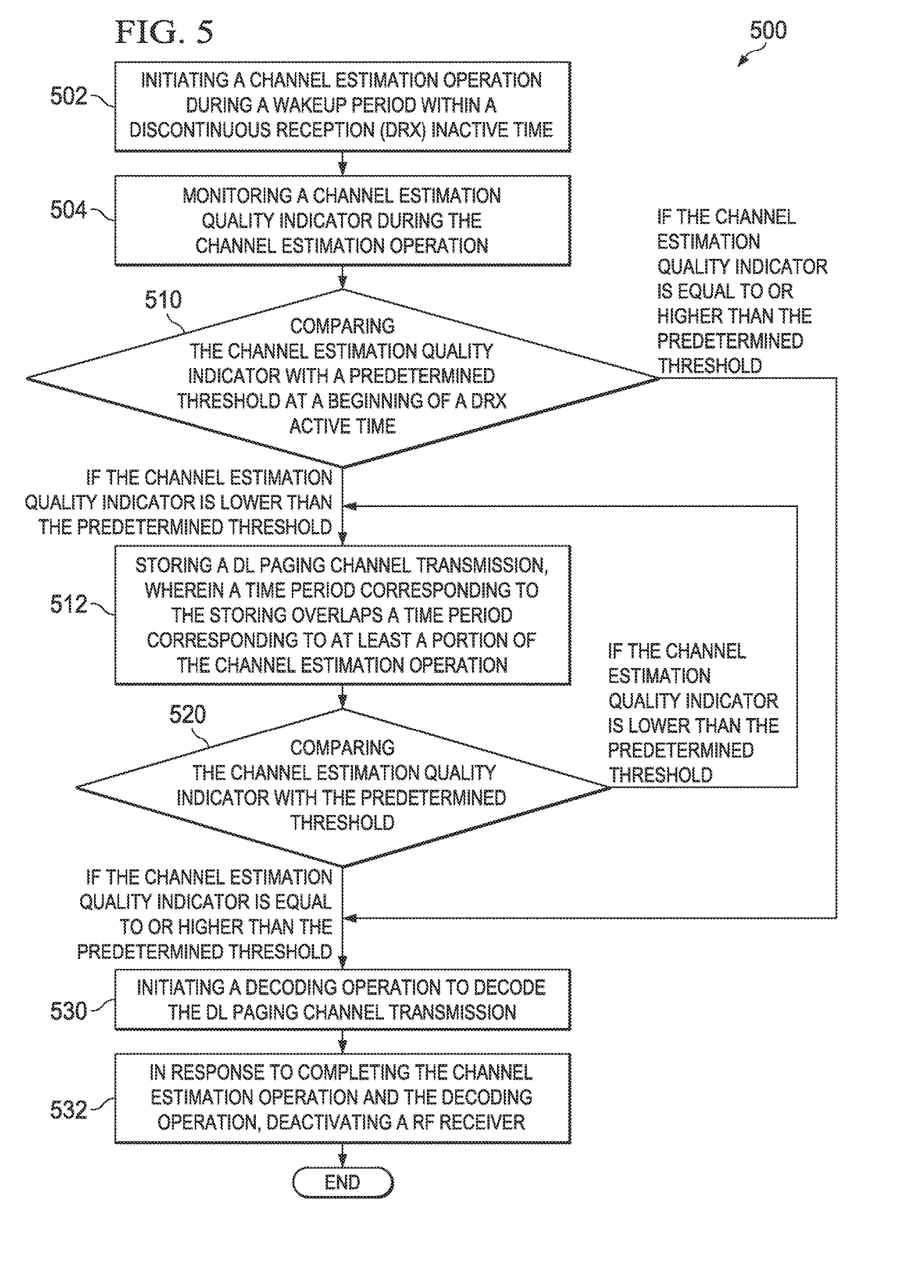
FIG. 5 is a flowchart illustrating a method for storing a DL paging channel transmission based on a channel estimation quality indicator.

Alternatively or in combination, the UE 102 may determine a wakeup period within a DRX inactive time. During the wakeup period, the UE 102 may initiate a channel estimation operation. The UE 102 may compare a channel estimation quality indicator with a predetermined threshold at the beginning of a DRX active time, when the base station 104 may start to transmit a DL paging channel transmission. If the channel estimation equality indicator is lower than the predetermined threshold, the UE 102 may store the DL paging channel transmission while the UE 102 continues to perform the channel estimation operation. The UE 102 may continue to monitor the channel estimation quality indicator until the channel estimation quality indicator is equal to or higher than the predetermined threshold. In such a case, the UE 102 may initiate a decoding operation to decode the stored DL paging channel transmission. FIGS. 4-5 and associated descriptions provide additional details of these implementations.

Turning to a general description of the elements, a UE may be referred to as mobile electronic device, user device, mobile station, subscriber station, portable electronic device, mobile communications device, wireless modem, or wireless terminal. Examples of a UE (e.g., the UE 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network.

Other examples of a UE include, but are not limited to, a television, a remote controller, a set-top box, a computer monitor, a computer (including a tablet, a desktop computer, a handheld or laptop computer, a netbook computer), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wristwatch, a clock, and a game device, etc. A UE may include a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. The term "UE" can also refer to any hardware or software component that can terminate a communication session for a user. In addition, the terms "user equipment," "UE," "user equipment device," "user agent," "UA," "user device," and "mobile device" can be used synonymously herein.

The wireless communication network 110 may include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (UMTS), Long Term Evaluation (LTE), or LTE Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station 104. A base station 104 may be a NodeB, an evolved NodeB (eNB), or an access point. A base station (e.g., the base station 104) may be a radio base station that may control all or at least some radio related functions in a fixed part of the system. The base station 104 may provide radio interface within their coverage area or a cell for the UE 102 to communicate. The base stations 104 may be distributed throughout the cellular network to provide a wide area of coverage. The base station 104 directly communicates to one or a plurality of UEs, other base stations, and one or more core network nodes.

While described in terms of FIG. 1, the present disclosure is not limited to such an environment. In general, wireless communication systems may be described as cellular networks made up of a number of radio cells, or cells that are each served by a base station or other fixed transceiver. The cells are used to cover different areas in order to provide radio coverage over an area. Example wireless communication systems include Global System for Mobile Communication (GSM) protocols, Universal Mobile Telecommunications System (UMTS), 3GPP Long Term Evolution (LTE), and others. In addition to wireless communication systems, wireless broadband communication systems may also be suitable for the various implementations described in the present disclosure. Example wireless broadband communication system includes IEEE 802.11 wireless local area network, IEEE 802.16 WiMAX network, etc.

FIG. 2 is an example timing diagram 200 for adaptively determining a wakeup period. The example timing diagram 200 includes a DRX inactive time 202, a DRX active time 240, a previous wakeup occasion 210, and a second wakeup occasion 250. During the previous wakeup occasion 210, a UE may wake up and receive a DL paging channel transmission. The UE may determine that the DL paging channel does not contain any messages that are directed to the UE. The UE may deactivate its RF receivers after the previous wakeup occasion 210.

The second wakeup occasion 250 includes a first PLL preparation period 224, a first wakeup period 220, and a DRX active time 240. During the first PLL preparation period 224, the UE may activate PLLs to settle their frequency with crystal reference. In some implementations, the UE may maintain its timing using a very low rate clock during the DRX inactive time 202. The timing therefore may drift during the DRX inactive time 202. During first PLL preparation period 224, the UE may activate its PLLs to lock their frequency to the crystal reference (either analog or digitally). The UE may perform a time synchronization operation and correct the timing draft. Alternatively or in combination, the UE may buffer signal samples and post process the signal samples to realize frequency and time synchronization.

In some implementations, the UE may determine the beginning of the first wakeup period 220 during the DRX inactive time 202. The first wakeup period 220 is the period from the time when the UE activates its RF receiver to the beginning of the DRX active time 240. In some implementations, the UE may determine the beginning of the first wakeup period 220 based on the needed channel estimation time. The needed channel estimation time may depend on a number of factors. For example, these factors may include the power level of the DL transmission, the channel bandwidth of the DL transmission, Doppler frequency of the DL channel (i.e., how fast the channel varies), and the length of the DRX inactive time 202. In some instances, the channel estimation time may also depend on whether the UE is in a connected mode or an idle mode. For example, if the UE is in a connected mode, the DL transmission may use a higher order modulation and coding scheme. Therefore, the channel estimation time may be longer because the UE may obtain a channel estimation of higher quality to decode the DL transmission. On the other hand, if the UE is in an idle mode, the DL transmission may use a lower order modulation and coding scheme and therefore the channel estimation time may be shorter.

In some implementations, the UE may determine the worst case channel estimation time, and in turn, the beginning of the first wakeup period 220 based on the information collected from the previous wakeup occasions. For example, the UE may use the power level of the DL transmission and the Doppler frequency in the previous wakeup occasion 210 to estimate the channel estimation time and add additional budgeted amount to account for channel variations between first 210 and second 250 wake-up occasions.

Alternatively or in combination, the UE may take a conservative approach and determine the beginning of the first wakeup period 220 based on the worst case scenarios. For example, the UE may determine the channel estimation time based on a low power level of the DL transmission regardless of the power level of the DL transmission during previous wakeup occasions. This approach may provide one or more advantages. For example, the coherence time of a channel may be short comparing to the length of the DRX inactive time 202. Therefore the channel may vary significantly between the previous wakeup occasion 210 and the second wakeup occasion 250. Determining a channel estimation time based on the worst case scenarios may provide the UE enough time to obtain a channel estimation with sufficient quality even if the power level of the DL transmission during the second wakeup occasion 250 is reduced significantly from the power level of the DL transmission during the previous wakeup occasion 210.

The first wakeup period 220 includes an Automatic Gain Control (AGC) activation period 222, a second PLL preparation period 234, and a second wakeup period 230. During the AGC activation period 222, the UE may activate an AGC. An AGC is a part of a RF receiver in the UE. In some implementations, the AGC may include a power estimation component that estimates the received power level of the DL transmission. The AGC may also include a gain adjustment component that adjusts the gain of the RF receiver based on the received power level of the DL transmission. In some instances, the UE may activate the power estimation component while keeping the gain adjustment component inactive during the AGC activation period 222 to save battery power. For example, the UE may set the gain value of the AGC to the gain value used in previous wakeup occasions minus a gain offset to avoid potential power saturations. The UE may determine the gain offset based on the Doppler frequency estimation of the channel and the length of the DRX inactive time 202. For example, if the Doppler frequency is high or the DRX inactive time 202 is long, the UE may set the gain offset to a large value. If the Doppler frequency is low and the DRX inactive time 202 is short, the UE may set the gain offset to a small value. Alternatively or in combination, the UE may set the gain offset to a fix value (e.g., 10 dB) to cover a wide range of power variation. If the measured power level of the DL transmission is too low or too high, the UE may further adjust the gain based on the measured power level.

The UE may use one or more receiver antennas to receive the DL transmission during the AGC activation period 222. In some implementations, the UE may use one receiver antenna during the AGC activation period 222. This approach may reduce battery power consumption of the UE.

During the AGC activation period 222, the UE may estimate the power level of the DL transmission using the power estimation component of the AGC. The UE may use the estimated power level of the DL transmission to determine the channel estimation period 238. Because the time frequency estimation period does not vary significantly, the UE may then determine the second wakeup period 230, which includes the time frequency estimation period 236 and the channel estimation period 238.

In some implementations, the UE may determine the channel estimation period 238 based on a SNR. The UE may calculate the SNR based on the power level of the DL transmission during the AGC activation period 222 and a noise reference power level. In some implementations, the UE may adjust the SNR based on a signal power offset. The following equation provides an example:

$$\text{SNR (in dB)} = P\text{total} - P\text{sigOffset} - P\text{noiseRef} \quad (1)$$

where Ptotal denotes the power level, PnoiseRef denotes the noise reference power level, and PsigOffset denotes the signal power offset.

In some implementations, the UE may determine the signal power offset based on the bandwidth of the DL transmission. For example in a LTE system, a base station may use all of the subcarriers to transmit the DL transmission. This may take place, e.g., during the first Orthogonal Frequency Division Multiplexing (OFDM) symbol in each DL subframe. The base station may also use some of the subcarriers to transmit the DL transmission. This may take place, e.g., during a Physical Downlink Shared Channel (PDSCH) region. If, during the AGC activation period 222, the UE estimates that all of the subcarriers are occupied for transmission, the UE may set PsigOffset to 0 dB. On the other hand, if the UE estimates that some of the subcarriers are occupied for transmission, the UE may set PsigOffset based on the ratio of the transmitted subcarriers to the total bandwidth. For example, if only RSs are transmitted in a PDSCH data region, the UE may set PsigOffset to 7.78 dB. In some implementations, the UE may set PsigOffset to 7.78 dB even if the UE estimates that some subcarriers are occupied for transmission. This approach may underestimate the SNR and provide a conservative prediction of the channel estimation period 238.

In some implementations, the AGC activation period 222 may include at least one OFDM symbol that carries a cell-specific RS. In some instances, the UE may choose the AGC activation period 222 that does not include a Multimedia Broadcast Multicast Service Single Frequency Network (MBSFN) subframe or an Almost Blank Subframe (ABS), because the base station may not transmit any cell-specific RS in a MBSFN subframe or an ABS. For example, the UE may receive the MBSFN configuration and the ABS configuration from the base station prior to entering into the DRX inactive time 202. During the DRX inactive time 202, the UE may track the subframe number and determine which subframe is a MBSFN subframe or an ABS based on the MBSFN configuration and the ABS configuration. The UE may then select the first wakeup period 220 and in turn, the AGC activation period 222, so that the AGC activation period 222 does not include the MBSFN subframe or the ABS.

In some implementations, the UE may determine the noise reference power level based on a background noise level and an estimated interference power level. The following equation provides an example:

$$P\text{noiseRef} = P\text{noisebg} + P\text{interference} \quad (2)$$

where Pnoisebg denotes the background noise level, and Pinterference denotes the estimated interference power level. In some implementations, the UE may estimate the interference power level based on the interference power level during the previous wakeup occasions (e.g., the previous wakeup occasion 210). For a cell-center UE, the interference power level may not change significantly during the DRX inactive time 202. For a cell-edge UE, where the interference power level may change significantly, the UE may include an additional margin in the estimated interference power level. In some implementations, the UE may identify whether the UE is at cell-edge or at cell-center based on the accumulated time-advance (TA) and/or the DL pathloss.

The UE may set the background noise level based on the thermal noise floor and the noise figure of the UE. The following equation provides an example:

$$P\text{noisebg} = -174 \text{ dBm/Hz} + 10*\log 10*BW + NF \quad (3)$$

where BW is the measuring bandwidth of the signal and NF is the noise figure of the UE receiver (e.g., 6 dB).

In some instances, the AGC may measure a smaller channel bandwidth during the AGC activation period 222 than during the second wakeup period 230. For example, in a LTE system, the AGC may measure a channel bandwidth of 1.4 MHz during the AGC activation period 222, while the AGC may measure a channel bandwidth of 5 MHz, 10 MHz, or 20 MHz during of the second wakeup period 230. The UE may use a lower sampling rate to measure the smaller bandwidth and save battery power.

In some implementations, the UE may determine the second wakeup period 230 based on a comparison of the SNR to at least one predetermined threshold. For example, the UE may identify k SNR thresholds. The k SNR thresholds are listed in order from the lowest value to the highest value. Each SNR threshold may correspond to a candidate wakeup period. If the SNR is higher than the i-th SNR threshold and lower than the (i+1)-th SNR threshold, the UE may set the second wakeup period 230 to the candidate wakeup period corresponding to the i-th SNR threshold.

The UE may determine the mapping between the candidate wakeup periods and the SNR thresholds based on analytical algorithms, simulation, testing, or a combination thereof. For example, the UE may simulate channel estimation quality under one example SNR threshold to determine the channel estimation time suitable for a reliable decoding of the DL transmission under the example SNR threshold. The UE may then add the time frequency estimation time to the channel estimation time to determine the candidate wakeup period corresponding to the example SNR threshold.

In some implementations, the UE may adaptively adjust the mapping between the candidate wakeup periods and the SNR thresholds. For example, the UE may adjust the mapping based on a block error rate (BLER) of the Physical Downlink Control Channel (PDCCH) messages. The UE may set a BLER for PDCCH message. During the previous wakeup occasion 210, the UE may decode the PDCCH message during the DRX active time. If the UE fails to decode the PDCCH message, the UE may increase some or all of the candidate wakeup periods by a predetermined amount. If the UE successfully decodes the PDCCH message, the UE may reduce some or all of the candidate wakeup periods by a predetermined amount.

In some implementations, the UE may compare the first wakeup period 220, the AGC activation period 222, and the second wakeup period 230 to determine whether the UE may deactivate its RF receiver during [the first wakeup period] 220. For example, if the length of the first wakeup period 220 is larger than the sum of the length of the AGC activation period 222 and the second wakeup period 230, the UE may deactivate its RF receiver after the end of the AGC activation period 222. This approach may reduce battery power consumption of the UE. The UE may activate its RF receiver at the beginning of the second wakeup period 230 and have sufficient time to perform the time frequency estimation operation and the channel estimation operation. If the length of the first wakeup period 220 is not larger than the sum of the length of the AGC activation period 222 and the second wakeup period 230, the UE may keep its RF receiver active to perform the time frequency estimation operation and the channel estimation operation.

Prior to the second wakeup period 230, the UE may activate its PLL to settle the frequency of PLLs with the crystal reference during the second PLL preparation period 234. The second wakeup period 230 includes a time frequency estimation period 236 and a channel estimation period 238. During the time frequency estimation period 236, the UE may estimate the time and frequency of the DL transmission. In some implementations, the UE may maintain a low rate clock, e.g., a Real-Time Clock (RTC) during the DRX inactive time 202. The RTC may be a 32.768 kHz crystal oscillator without temperature compensation. When the UE wakes up, the UE may set its system clock to a much higher frequency, e.g., 19.2 MHz or 26 MHz. Therefore the UE may settle its frequency and amplitude during the time frequency estimation period 236.

During the channel estimation period 238, the UE may perform a channel estimation operation and obtain an estimation of the DL channel. During the DRX active time 240, the UE may receive the DL paging channel transmission. The UE may decode the DL paging channel transmission. In some implementations, the UE may activate its baseband receiver at the beginning of the second wakeup period 230 and keep the baseband receiver active until the end of the DRX active time 240.

In some implementations, the UE may determine a number of receiver antennas based on the power level of the DL transmission the UE received during the AGC activation period 222. For example, if the power level of the DL transmission in the AGC activation period 222 is larger than a threshold, the UE may determine that one receiver antenna may be sufficient to receive a DL transmission in the DRX active time 240. If the power level of the DL transmission during the AGC activation period 222 is lower than the threshold, the UE may determine that two or more receiver antennas may be used to receive a DL transmission during the DRX active time 240. In some implementations, the UE may determine the threshold based on the anticipated modulation and coding scheme (MCS) of the DL transmission in the DRX active time 240. For example, if the UE has sent high channel quality indicators to the base station for a PDSCH transmission, the UE may anticipate a DL transmission with a high MCS. In some instances, a high MCS may correspond to a MCS that uses a high order modulation, such as 16 (Quadrature amplitude modulation) QAM or 64 QAM. Alternatively or in combination, a high MCS may correspond to a MCS that uses a high coding rate, e.g., a coding rate larger than 0.5. Therefore the UE may set the threshold to a high value. Alternatively or in combination, if the UE has sent low channel quality indicators to the base station for a PDSCH transmission or if the UE expects a potential paging message, the UE may set the threshold to a low value. During the DRX active time 240, the UE may use the determined number of receiver antennas to receive a DL transmission.

FIG. 3 is a flowchart 300 illustrating a method for adaptively determining a wakeup period. The flowchart begins at step 302 where a UE determines a received power level of a DL transmission from a base station during a first wakeup period within a DRX inactive time. In some implementations, the base station may be an eNB.

At step 304, the UE determines a noise reference power level based on a background noise level and an interference power level in a previous DRX active time. At step 306, the UE determines a signal power offset. In some implementations, the UE may determine the signal power offset based on the bandwidth of the DL transmission.

At step 308, the UE determines a SNR based on the received power level of the DL transmission, the signal power offset, and the noise reference power level. At step 310, the UE determines a second wakeup period based on a comparison of the SNR to at least one predetermined threshold. In some implementations, the UE may determine the second wakeup period based on a BLER of PDCCH messages.

At step 312, the UE deactivates a RF receiver in response to the determination of the second wakeup period. In some cases, as described in detail associated with FIG. 2, the UE may keep the RF receiver active based on the comparison of the first wakeup period and the second wakeup period. At step 314, the UE determines a number of receiver antennas based on the received power level of the DL transmission. At step 316, the UE activates the RF receiver at a beginning of the second wakeup period prior to a DRX active time. At step 318, the UE receives a DL paging channel transmission during the DRX active time. In some implementations, the UE may use the determined number of receiver antennas to receive the DL paging channel transmission.

FIG. 4 is an example timing diagram 400 for storing a DL paging channel transmission based on a channel estimation quality indicator. The example timing diagram 400 includes a DRX inactive time 402, a DRX active time 440, a previous wakeup occasion 410, and a current wakeup occasion 450. During the previous wakeup occasion 410, a UE may wake up and receive a DL paging channel transmission. The UE may determine that the DL paging channel does not contain any messages that are directed to the UE. The UE may deactivate its RF receivers after the previous wakeup occasion 410

The second wakeup occasion 450 includes a PLL preparation period 454, an AGC activation period 452, a time frequency estimation period 456, and a channel estimation period 458. During the PLL preparation period 454, the UE may activate its PLLs to settle the frequency to a reference crystal oscillator.

In some implementations, the UE may activate its RF receiver at the beginning of the AGC activation period 452. The UE may keep its RF receiver active until the later of the end of the channel estimation period 458 and the end of the DRX active time 440. For example, in some instances, the UE may complete the channel estimation operation before the end of the DRX active time 440. In such a case, the end of the DRX active time 440 may occur at the end of the DRX active time 440. Therefore the UE may keep its RF receiver active until the end of the DRX active time 440, and the UE has a wakeup period from the beginning of the AGC activation period 452 to the end of the DRX active time 440. In some other instances, as in the illustrated example, the UE may complete the channel estimation operation after the end of the DRX active time 440. In such a case, the end of the DRX active time 440 may occur before the end of the channel estimation period 458. Therefore the UE may keep its RF receiver active until the end of the channel estimation period 458, and the UE has a wakeup period from the beginning of the AGC activation period 452 to the end of the channel estimation period 458.

In some implementations, the UE may predict a channel estimation time and determine the beginning of the wakeup period based on the predicted channel estimation time. As described previously, the UE may predict the channel estimation time based on a number of factors. These factors may include the power level of the DL transmission, the channel bandwidth of the DL transmission, Doppler frequency of the DL channel, and the length of the DRX inactive time 402. In some implementations, the UE may take a conservative approach and predict a channel estimation time based on the worst case scenarios. Alternatively or in combination, the UE may predict a channel estimation time based on the information collected from the previous wakeup occasions. Under this approach, the UE may predict a shorter channel estimation time, and in turn determine a later beginning of the wakeup period. This approach may reduce the wakeup period and save battery power assumption of the UE. In some cases, the predicted channel estimation time may be shorter than the channel estimation period 458 because RF conditions have changed between wakeup occasions. In such a case, the UE may store the DL transmission during the DRX active time 440, while continuing to perform the channel estimation operation.

During the AGC activation period 452, the UE may activate its AGC. In some implementations, the UE may activate both the power estimation component and the gain adjustment component of the AGC during the AGC activation period 452 to prepare for the receiving operation during the DRX active time 440. In some implementations, the UE may compare the power level of the DL transmission during the AGC activation period 452 with at least one predetermined threshold. If the power level is lower than the at least one predetermined threshold, the UE may increase the channel estimation time. The UE may therefore store the DL transmission during the DRX active time 440 while the UE continues to perform the channel estimation operation. In some implementations, as provided in detail in the descriptions associated with FIG. 2, UE may determine a SNR based on the power level of the DL transmission during the AGC activation period 452 and a noise reference power level. The UE may compare the SNR with at least one predetermined threshold to determine whether to increase the channel estimation time.

During the time frequency estimation period 456, the UE may estimate the time and frequency offset in the received DL signal. During the channel estimation period 458, the UE may perform a channel estimation operation and obtain an estimation of the DL channel. In some implementations, the UE may monitor a channel estimation quality indicator during the channel estimation period 458. The channel estimation quality indicator may indicate the quality of the channel estimation. In some implementations, the UE may determine the channel estimation quality indicator based on the total accumulated energy of the RS received during the channel estimation operation. Alternatively or in combination, the UE may determine the channel estimation quality indicator based on the magnitude of the RS received during the channel estimation operation, the standard deviation of consecutive running estimations over time, or other factors.

The UE may compare the channel estimation quality indicator with a predetermined threshold to determine whether the UE has obtained a channel estimation with sufficient quality. In some instances, the UE may compare the channel estimation quality indicator with the predetermined threshold at the beginning of the DRX active time 440. If the channel estimation quality indicator is equal to or higher than the predetermined threshold, the UE may terminate the channel estimation operation and start to receive the DL transmission. If the channel estimation quality indicator is lower than the predetermined threshold, as in the illustrated example, the UE may store the DL transmission (e.g., in a memory) during the DRX active time 440, while the UE continues to perform the channel estimation operation. Performing the channel estimation operation during the DRX active time 440 may provide a better demodulation performance. In some cases, the stored DL transmission may be a DL paging channel transmission.

In some implementations, while the UE stores the DL transmission during the DRX active time 440, the UE may continue to calculate the channel estimation quality indicator and compare the channel estimation quality indicator with the predetermined threshold. The UE may continue to perform the channel estimation operation until the channel estimation quality indicator is equal to or higher than the predetermined threshold. When the channel estimation quality indicator is equal to or higher than the predetermined threshold, the UE may terminate the channel estimation operation and begins to decode the stored DL transmission. In some implementations, the UE may deactivate its RF receiver after completing the channel estimation operation and the decoding operation.

FIG. 5 is a flowchart 500 illustrating a method for storing a DL paging channel transmission based on a channel estimation quality indicator. The flowchart begins at step 502 where a UE initiates a channel estimation operation during a wakeup period within a DRX inactive time. At step 504, the UE monitors a channel estimation quality indicator during the channel estimation operation.

At step 510, the UE compares the channel estimation quality indictor with a predetermined threshold at a beginning of a DRX active time. If the channel estimation quality indictor is equal to or higher than the predetermined threshold, the flowchart proceeds to step 530. If the channel estimation quality indictor is lower than the predetermined threshold, the flowchart proceeds to step 512. At step 512, the UE stores a DL paging channel transmission. In some cases, the time period corresponding to the storing may overlap a time period corresponding to at least a portion of the channel estimation operation. At step 520, the UE continues to monitor the channel estimation quality indicator and compares the channel estimation quality indicator with the predetermined threshold. The UE continues to store the DL paging channel transmission while the channel estimation quality indicator is lower than the predetermined threshold. If the channel estimation quality indicator is equal to or higher than the predetermined threshold, at step 530, the UE initiates a decoding operation to decode the DL paging channel transmission. In some cases, the decoding operation is performed on the stored DL paging channel transmission.

At step 532, the UE deactivates a RF receiver after the UE completes the channel estimation operation and the decoding operation.

A number of embodiments of the invention have been described. Nevertheless, it will be understood that various modifications may be made without departing from the spirit and scope of the invention. Accordingly, other embodiments are within the scope of the following claims.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation descried above should not be understood as requiring such separation in all implementations, and it should be understood that the described program components and systems can generally be integrated together in a signal software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing form the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps are not implied by the order they appear in the claims.

What is claimed is:

1. A method, comprising:
   activating, at a user equipment (UE), a radio frequency (RF) receiver at a beginning of a first wakeup period, wherein the beginning of the first wakeup period is determined based on a channel estimation time period;
   measuring a received power level of a base station based on at least one reference symbol during the first wakeup period using the RF receiver;
   determining a second wakeup period based on the measured received power level;
   determining to deactivate the RF receiver based on a comparison between a length of the first wakeup period and a length of the second wakeup period;
   in response to the determining to deactivate the RF receiver, deactivating the RF receiver until a beginning of the second wakeup period;
   activating the RF receiver at the beginning of the second wakeup period; and
   receiving a Downlink (DL) paging channel transmission.

2. The method of claim 1, wherein determining the second wakeup period further comprising:
   determining a Signal to Noise Ratio (SNR) based on the received power level and a noise reference power level; and
   determining the second wakeup period based on a comparison of the SNR to at least one predetermined threshold.

3. The method of claim 2, wherein determining the SNR further comprising:
   determining a signal power offset; and
   determining the SNR based on the received power level, the signal power offset, and the noise reference power level.

4. The method of claim 2, wherein the noise reference power level is determined based on a background noise level and an interference power level.

5. The method of claim 1, wherein the second wakeup period is further determined based on a block error rate (BLER) of Physical Downlink Control Channel (PDCCH) messages.

6. The method of claim 1, further comprising:
   determining a number of receiver antennas based on the received power level; and
   receiving the DL paging channel transmission using the determined number of receiver antennas.

7. The method of claim 1, wherein the base station is an evolved NodeB (eNB).

8. A user equipment (UE), comprising:
   one or more processors configured to:
      activate a radio frequency (RF) receiver at a beginning of a first wakeup period, wherein the beginning of the first wakeup period is determined based on a channel estimation time period;
      measure a received power level of a base station based on at least one reference symbol during the first wakeup period using the RF receiver;
      determine a second wakeup period based on the measured received power level;
      determine to deactivate the RF receiver based on a comparison between a length of the first wakeup period and a length of the second wakeup period;
      in response to the determining to deactivate the RF receiver, deactivate the RF receiver until a beginning of the second wakeup period;
      activate the RF receiver at the beginning of the second wakeup period; and
      receive a Downlink (DL) paging channel transmission.

9. An apparatus comprising instructions embodied on a tangible, non-transitory computer-readable medium, the instructions operable when executed to cause a computing system to perform operations comprising:
   activating, at a user equipment (UE), a radio frequency (RF) receiver at a beginning of a first wakeup period, wherein the beginning of the first wakeup period is determined based on a channel estimation time period;
   measuring a received power level of a base station based on at least one reference symbol during the first wakeup period using the RF receiver;
   determining a second wakeup period based on the measured received power level;
   determining to deactivate the RF receiver based on a comparison between a length of the first wakeup period and a length of the second wakeup period;
   in response to the determining to deactivate the RF receiver, deactivating the RF receiver until a beginning of the second wakeup period;
   activating the RF receiver at the beginning of the second wakeup period; and
   receiving a Downlink (DL) paging channel transmission.

* * * * *